United States Patent [19]
Jackson et al.

[11] Patent Number: 5,499,255
[45] Date of Patent: Mar. 12, 1996

[54] COAXIAL HYBRID WIGGLER

[75] Inventors: Robert H. Jackson, Springfield; Henry P. Freund, Vienna; Dean E. Pershing, Springfield, all of Va.; José M. Taccetti, Greenbelt, Md.

[73] Assignee: The United States of America as represented by the Secretary of the Navy, Washington, D.C.

[21] Appl. No.: 274,183

[22] Filed: Jul. 12, 1994

[51] Int. Cl.⁶ .................................................. H01S 3/00
[52] U.S. Cl. ..................................... 372/2; 372/37
[58] Field of Search ............................. 372/2, 37

[56] References Cited

U.S. PATENT DOCUMENTS

| | | | |
|---|---|---|---|
| 4,876,687 | 10/1989 | Feinstein | 372/2 |
| 5,068,860 | 11/1991 | Hartemann et al. | 372/2 |
| 5,095,486 | 3/1992 | Etievant | 372/37 |
| 5,115,439 | 5/1992 | Howard | 372/37 |
| 5,144,193 | 9/1992 | Warren | 372/2 |

OTHER PUBLICATIONS

R. H. Jackson et al., Coaxial Hybrid Iron (CHI) Wiggler, SPIE vol. 2013, p. 162 (reporting papers presented at a conference Jul. 13–14, 1993).

*Primary Examiner*—Leon Scott, Jr.
*Attorney, Agent, or Firm*—Thomas E. McDonnell; Edward F. Miles

[57] ABSTRACT

An electromagnetic wiggler having a cylindrical member, and a central member disposed axially within the cylindrical member, both of which are formed from alternating cylindrical sections of ferromagnetic and non-ferromagnetic material, each sequential pair of these sections being the length of the wiggler's period $\lambda_w$. The sequence of sections between the inner and outer members is shifted $\lambda_w/2$, so that ferromagnetic sections of the outer member are disposed radially opposite non-ferromagnetic sections of the inner member, and vice versa. The resultant radial magnetic flux density in the cylindrical gap between the members is larger and sharper than the flux density for the same wiggler without the central member, permitting higher radiated power output, at higher radiation frequencies, for the same energy of input electron beam.

6 Claims, 7 Drawing Sheets

COAXIAL HYBRID WIGGLER

BACKGROUND

Free-electron lasers are attractive as tunable sources of coherent radiation, and electromagnetic wigglers are singularly attractive to drive such lasers. However, the kinetic energy (or voltage) of electron beams which drive such wigglers at infrared and millimeter wavelength are often beyond the limits desirable for many applications. With high energy electron beams, necessary radiation shielding can become sizeable, and limits the use of wigglers in confined areas where space is at a premium, for example aboard military platforms such as ships or aircraft. Moreover, because the frequency of radiation depends on how fast the electron beam transverses the wiggler's spatial periods, one is naturally tempted to increase frequency by increasing electron beam energy. The use of harmonic laser operation, and smaller period wigglers, are being tested as ways to increase the frequency of radiated power without changing beam energy. Each has advantages and disadvantages, depending on the system or application. Microwigglers (wiggler period $\lambda_w < 5$ mm) permit reduction of operating voltages proportional to $(\lambda_w)^{1/2}$, with consequent reduction in shielding requirements, and cost. It has been difficult to fabricate small period wigglers with high magnetic field strength and uniformity with both a usefully large gap between opposite wiggler magnetic poles and good electron beam focusing.

Prior work shows that one can produce large wiggler flux intensities by immersing a periodic array of ferromagnetic material in a magnetic field, typically solenoid generated, which is directed axially along the wiggler, i.e., parallel to the direction of the electron beam's entry. The ferromagnetic material pulls the axially directed solenoid flux periodically up or down producing useful radially directed wiggler magnetic fields. This scheme combines the advantages of design simplicity with the ease of generating large solenoid fields, but also has the disadvantages of large residual axial fields within the wiggler, and large radial variations in the wiggler field away from the wiggler's axis of symmetry (the direction along which the electron beam enters the wiggler). Large axial magnetic fields can combine with radial fields to cause electron gyro-resonance, which can result in more intense radiation, but if the gyro-radius is too large, can cause the electron beam to strike and damage the wiggler structure.

SUMMARY OF THE INVENTION

Accordingly, an object of the invention is to increase wiggler radiated power without increasing the energy/voltage of the wiggler's electron beam.

Another object is to reduce the radiation shielding needed for wiggler operation.

Another object is to increase wiggler radiation frequency without increasing the energy voltage of the wiggler's electron beam.

Another object is to produce large, sharper, wiggler magnetic fields.

Another object is to produce a more uniform wiggler field away from the wiggler's central axis (i.e., the input direction of the wiggler's electron beam).

In accordance with these objects, and others made apparent hereinafter, the invention concerns an electromagnetic wiggler having a cylindrical member, and a central member disposed axially within the cylindrical member, both of which are constituted from alternating cylindrical sections of ferromagnetic and non-ferromagnetic material, each sequential pair of these sections being the length of the wiggler's period $\lambda_w$. The sequence of sections between the inner and outer members is shifted $\lambda_w/2$, so that ferromagnetic sections of the outer member are disposed radially opposite non-ferromagnetic sections of the inner member, and vice versa.

The ferromagnetic material in each member pulls any axially directed magnetic field (e.g. generated by a solenoid) toward itself, producing radially directed fields of sequentially alternating polarities (i.e. wiggler fields). Because of the central member, the effect is more pronounced, resulting in more of the axial field being bent radially. The resultant wiggler fields are more intense and sharper than without the central member. The larger and sharper radial (i.e. wiggler) fields increase the intensity of wiggler radiation, without any change in electron beam energy. Thus one can generate higher radiated power, without needing to increase radiation shielding. The central member, providing ferromagnetic material along the central axis, acts to increase the radial magnetic field in the gap between the central member and the cylindrical member. An additional effect is the field is greatest at the edges of the gap which helps to confine the beam within the gap.

These and other objects, features, and advantages of the invention are further understood from the following detailed description of particular embodiments. However, the invention is capable of extended application beyond the details of these embodiments. One can change and modify the embodiments without escaping the spirit and scope of the invention, as expressed in the appended claims. The embodiments are described with reference to the accompanying drawings, wherein:

BRIEF DESCRIPTION OF THE DRAWING FIGURES

DETAILED DESCRIPTION

Figure 1:
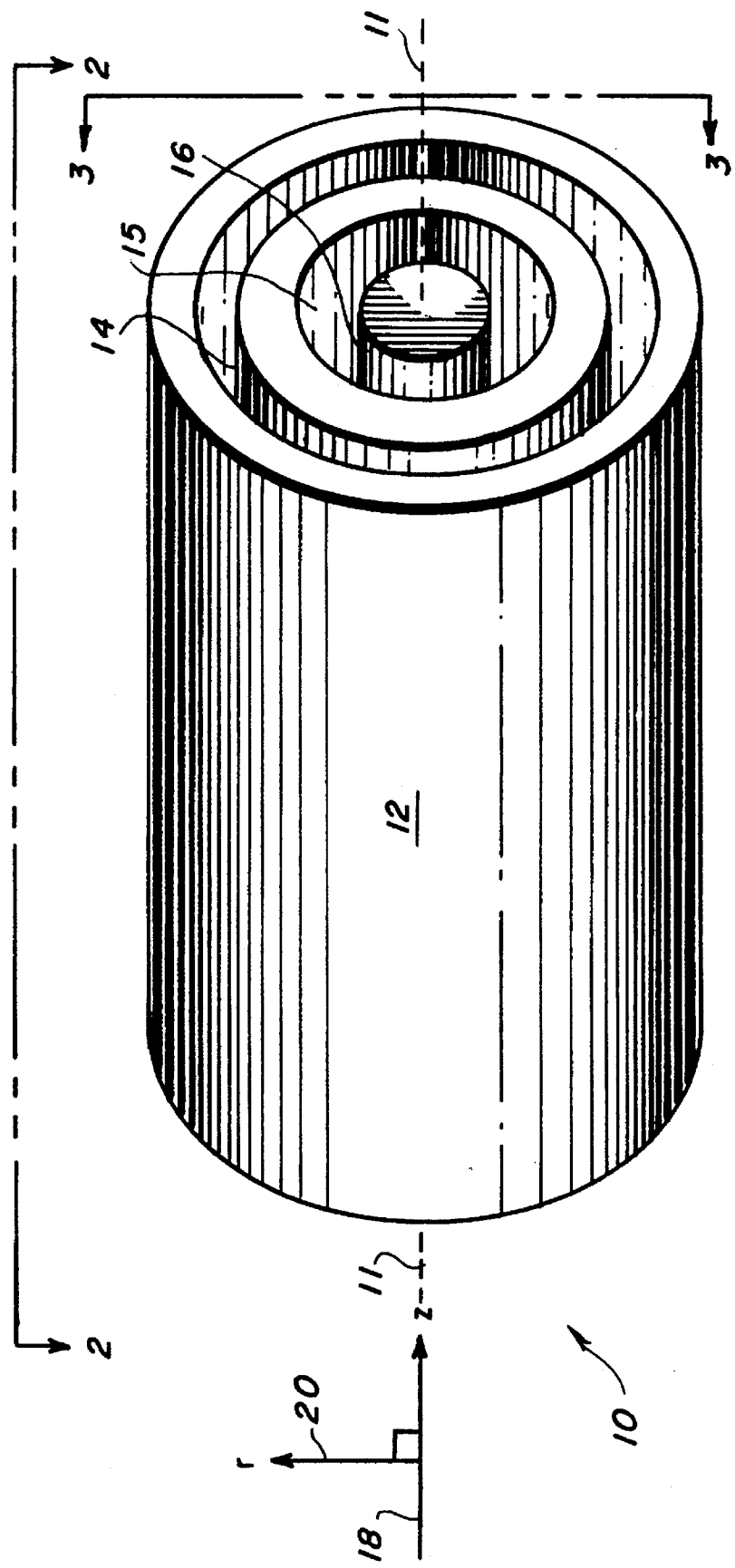
FIG. 1 is an isometric elevational view of an embodiment according to the invention.
Figure 3:
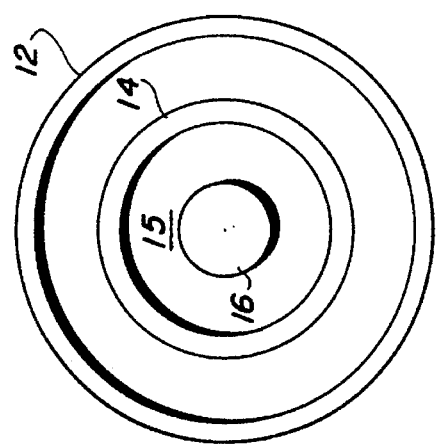
FIG. 3 is a side elevational view of the embodiment in the direction of lines 3—3 of FIG. 1.

With reference to the drawing figures, wherein like references indicate like parts throughout the several views, and with particular reference to FIGS. 1 and 3, an embodiment 10 of a wiggler according to the invention is shown. Wiggler 10 has a central axial member 16 disposed along device centerline 11, and circumferentially surrounded by outer member 14. Members 14, 16 define a gap 15 between them for receipt of a hollow cylindrical wiggler electron beam. Surrounding both members 14, 16 is a solenoid 12 for generating an axial magnetic field along centerline 11. For convenience, two orthogonal directions 18, 20 are illustrated in FIG. 1. Direction 18, or the "z" or axial direction, is co-extensive with device axial centerline 11. Direction 20, the radial direction, is orthogonal to direction 18, and would be similarly transverse to an annular electron beam injected into gap 15.

Figure 2:
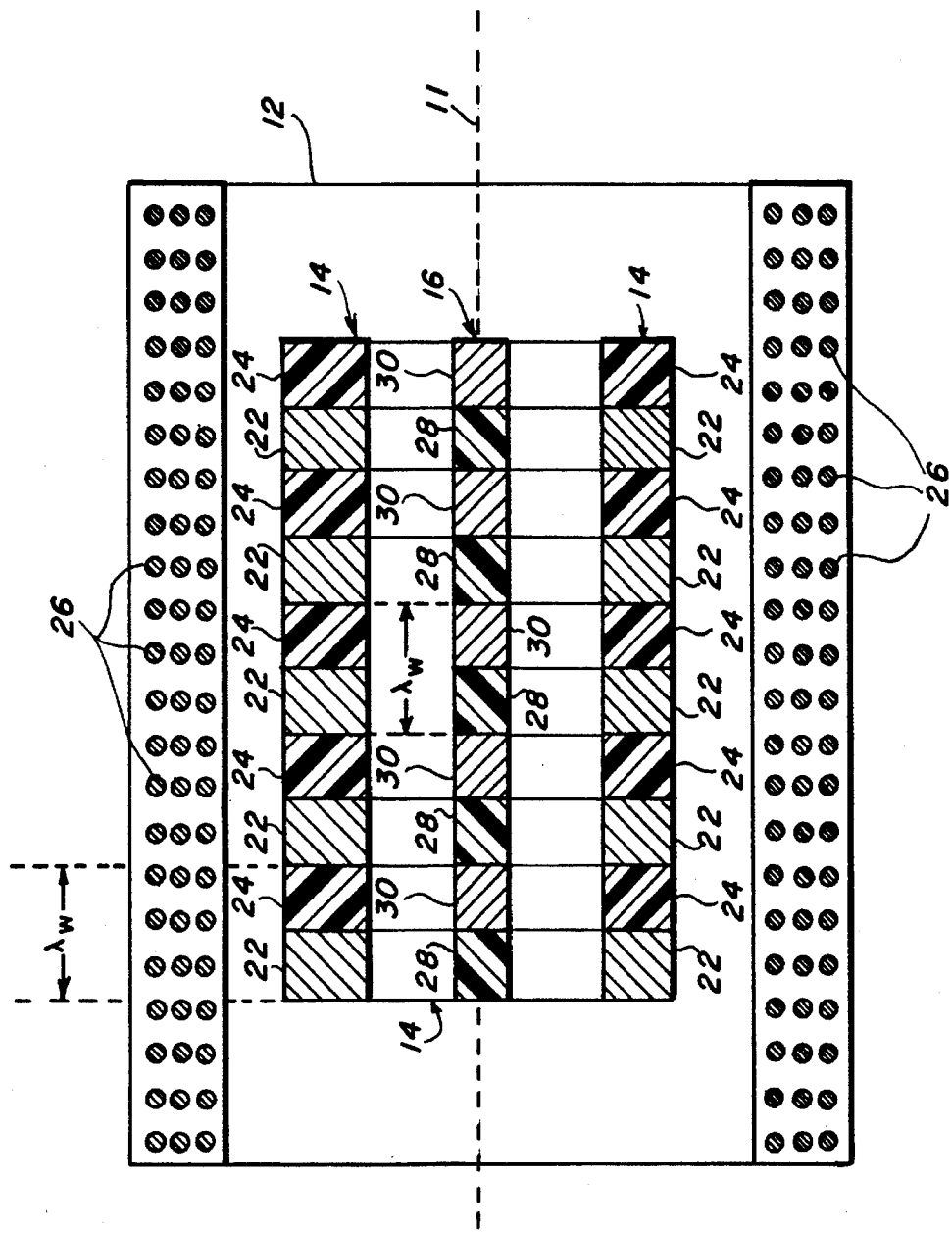
FIG. 2 is a sectional view of the embodiment of FIG. 1 of a cut in the direction of lines 2—2 of FIG. 1.

With particular reference to FIG. 2, outer member 14 is composed of a series of sections 22, 24, disposed along, and cylindrically about axial centerline 11, alternating ones of which are of ferromagnetic material (22), and non-ferromagnetic material (24). Similarly, central member 16 is composed of a series of sections 28, 30 alternating ones of which are also of ferromagnetic material (28), and non-ferromagnetic material (24). The thicknesses of these sections along axial direction 11 are such that the total thickness of any two adjacent sections 22, 24, or 28, 30, are the same, and define wiggler 10's period $\lambda_w$, the spatial distance in which wiggler 10's radial field goes through one complete cycle of radial polarity. Although spaced the same, the disposition of these sections is shifted one half $\lambda_w$ between the inner member 16 and outer member 14, so that in radial direction 20 a non-ferromagnetic section 30 is opposite a ferromagnetic section 22, and ferromagnetic section 28 is opposite a non-ferromagnetic section 24. Solenoid 12 contains field windings 26 to produce a magnetic flux along axis 11.

The material of ferromagnetic sections 22 and 28 is preferably iron or iron alloy, because these are strongly magnetic, and are easily milled. Any good and easily and finely milled dielectric will suffice for the non-ferromagnetic material of sections 24, 30, for example teflon.

Figure 4:
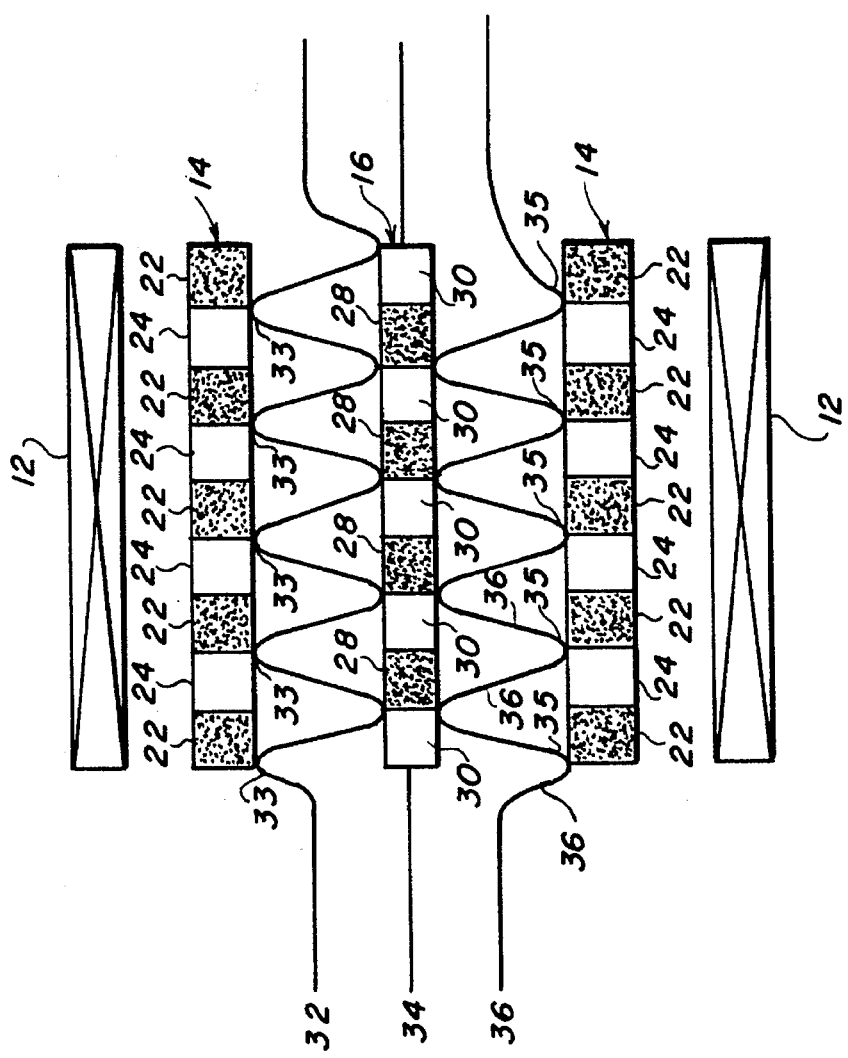
FIG. 4 is a schematic representation of the embodiment of FIGS. 1–3, illustrating various of its operational features.

FIG. 4 illustrates schematically the effect of members 14, 16. Axial flux lines 32, 34, 36 from solenoid 12 enters gap 15 between members 14, 16 and are pulled up or down towards ferromagnetic sections 22, 28 to create radially directed wiggler fields having peaks 33, 35 along direction 20. The residual axially directed field (not shown) will generally ripple as a function of axial position, with ripple peaks being in the vicinity of non-ferromagnetic sections 24, 30. Because of central member 16, more of solenoid 12's axial field is pulled into radial direction 20, resulting in a stronger radial field, and reduced axial fields, between members 14, 16 than would be present within member 14 alone. The ability of current milling technology to produce sections 22, 24, 28, 30 to sub-millimeter sized dimensions enables one to sharpen radially directed magnetic peaks 33, 35, to increase radiated power and increase the frequency range of radiated power.

Wiggler 10 preferably has right circular cylindrical geometry, as in the embodiment of FIGS. 1-4, because of the natural symmetry of such geometry, and the ease by which hollow right circularly cylindrical electron beams can be generated, although this does not preclude other cylindrical geometries.

One can write analytic expressions for $B_r$ and $B_z$ (magnetic flux density in radial direction 20 and axial direction 18, respectively) by solving Laplace's equation subject to boundary conditions imposed by wiggler 10. For the right circular geometry shown in FIGS. 1-4, the expressions for $B_r$ and $B_z$ are:

$$B_r(r,z) = 2B_0 \sum_{n=1}^{\infty} \frac{\sin k_n z}{G_0(k_n R_{out}, k_n R_{in})} \times$$

$$\left\{ \frac{\sin(k_n \Delta_{out}/2)}{(k_n \Delta_{out}/2)} [I_1(k_n r) K_0(k_n R_{in}) + K_1(k_n r) I_0(k_n R_{in})] - (-1)^n \frac{\sin(k_n \Delta_{in}/2)}{(k_n \Delta_{in}/2)} \times \right.$$

$$\left. [I_1(k_n r) K_0(k_n R_{out}) + K_1(k_n r) I_0(k_n R_{out})] \right\},$$

and $$B_z(r,z) = B_0 + 2B_0 \sum_{n=1}^{\infty} \frac{\cos k_n z}{G_0(k_n R_{out}, k_n R_{in})} \times$$

$$\left\{ \frac{\sin(k_n \Delta_{out}/2)}{(k_n \Delta_{out}/2)} G_0(k_n r, k_n R_{in}) - \right.$$

$$\left. (-1)^n \frac{\sin(k_n \Delta_{in}/2)}{(k_n \Delta_{in}/2)} G_0(k_n r, k_n R_{out}) \right\},$$

where:

$k_n$ is the nth harmonic of the wiggler wavenumber, i.e. $k_n = 2\pi n/\lambda_w$;

$R_{in}$ is the outer radius of inner member 14;

$R_{out}$ is the inner radius of outer member 16;

$\Delta_{in}$ is the width in axial direction 18 of ferromagnetic sections 22;

$\Delta_{out}$ is the width in axial direction 18 of ferromagnetic sections 28;

$I_0$ and $I_1$ are modified Bessel functions of the first kind, of respective orders 0 and 1;

$K_0$ and $K_1$ are modified Bessel functions of the second kind, of respective orders 0 and 1;

$G_0(x_1, x_2) = I_0(x_1) K_0(x_2) - I_0(x_2) K_0(x_2)$, for any real numbers $x_1$, $x_2$.

Note that typically $\Delta_{in} = \Delta_{out} = \lambda_w/2$, in which case the sine terms in the above equations for $B_r$ go to zero for even harmonics, and are non-zero for odd harmonics. Thus in this case the wiggler field will have only odd harmonics.

Figure 5:
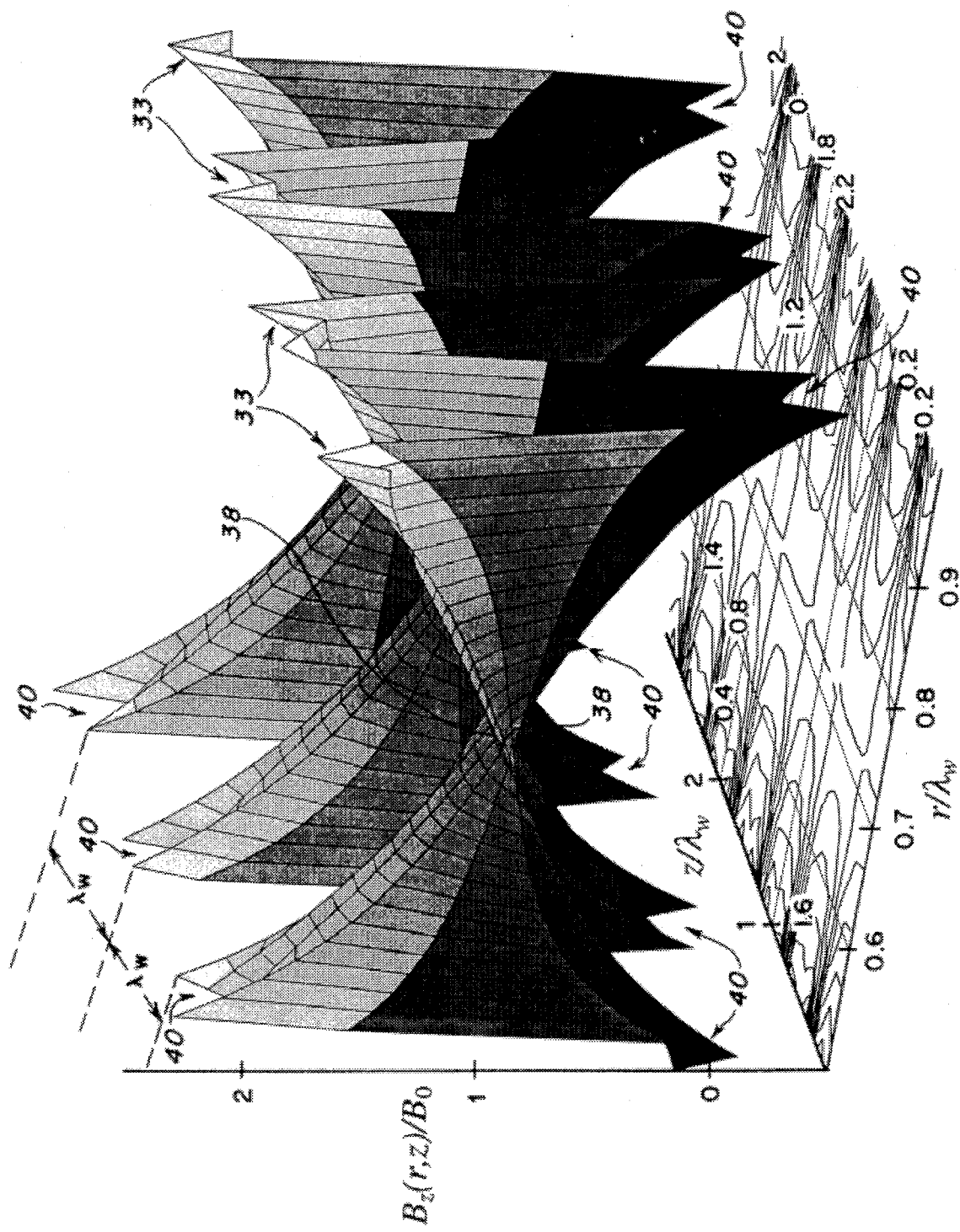
FIG. 5 is a surface (contour) plot of normalized axial magnetic flux density, as a function of radial and axial position, in an embodiment like that of FIGS. 1–4, for a specified $\lambda_w$.

FIG. 5 shows a three dimensional plot of axial magnetic flux density $B_z$, using the above equations, in wiggler gap 15 as a function of axial position z (direction 18) and radial position r (direction 20), for three wiggler periods. The plot in FIG. 5 was calculated for a gap 15 one half of $\lambda_w$ and for sections 22 and 28 being of 1010 annealed steel. (Indeed, for the devices discussed in all of FIGS. 5-10, all of the ferromagnetic sections are of 1010 annealed steel.) Experience has shown that the gap length-to-$\lambda_w$ ratio can be within the range of about 0.35 to 0.8 for a device like that of FIGS. 1-4, and still maintain the advantages recited in conjunction with these figures (e.g. greater wiggler field, frequency range, greater power output, etc.). Outside this range, one can maintain these advantages only by increasing beam kinetic energy. In FIG. 5, $B_z$ is normalized to $B_0$, the average value of axial magnetic flux in gap 15, and r and z are normalized to wiggler period $\lambda_w$, which is a realistic operating dimensioning. As can be seen, axial flux peaks 33, 35 at about $r/\lambda_w=0.5$ and 1, but minimizes sharply (38) away from either member 14 or 16, indicating suppression of axial magnetic field away from device 10's centerline, i.e. suppression where the electrons will travel. Contour lines in the r-z plane are equipotential lines projected on the plane from the $B_z$ contours.

Figure 6:
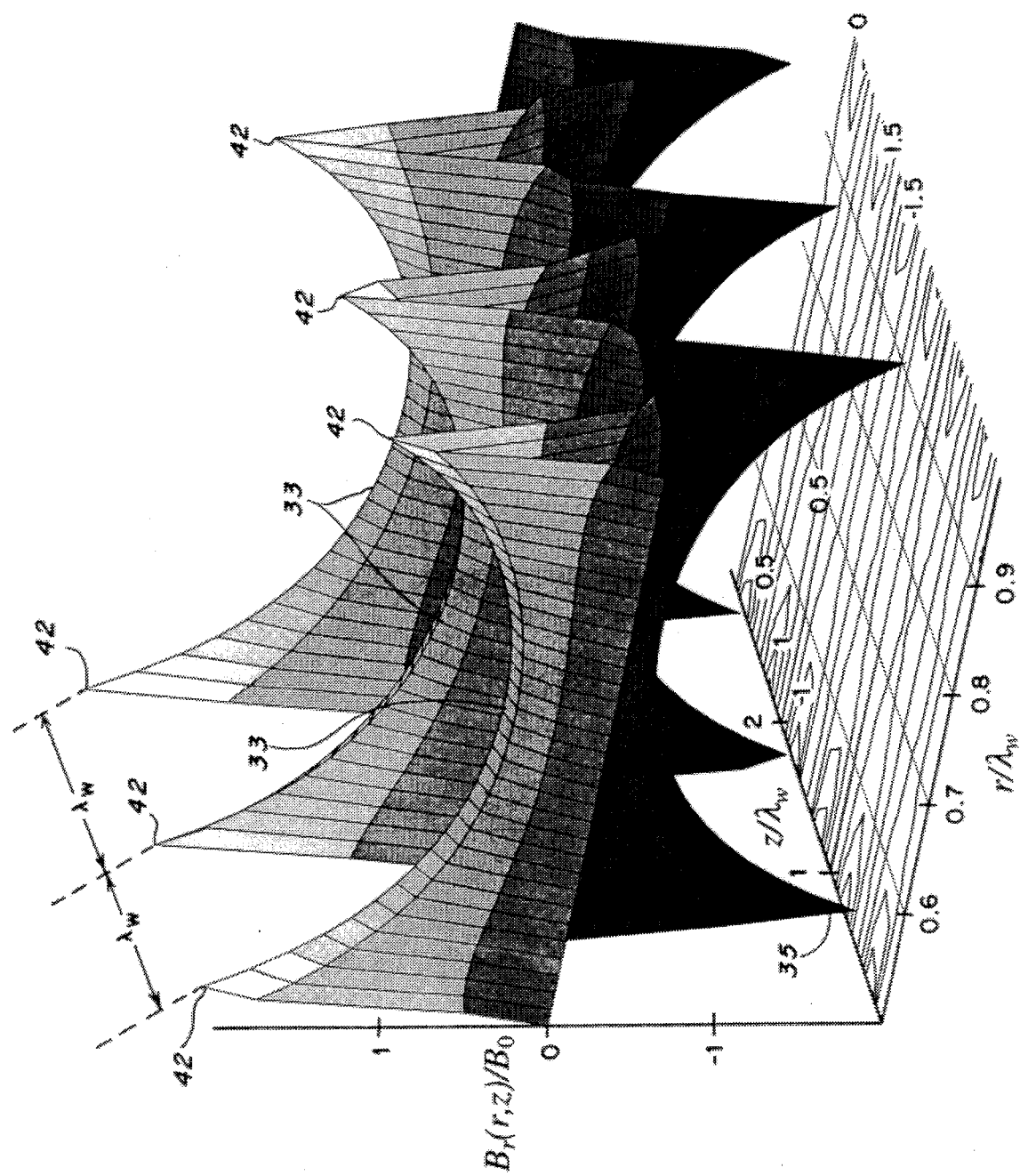
FIG. 6 is a surface plot of the normalized radial magnetic flux density of the embodiment of FIG. 5.

FIG. 6 is a contour plot calculated from the above equations, similarly normalized, again for a gap 15 one half of $\lambda_w$, but which shows a radial magnetic flux density $B_r$ in gap 15, normalized to average axial flux $B_0$. Like the axial flux shown in FIG. 5, $B_r$ has peaks 42 near ferromagnetic material at the surface of members 14, 16. Away from members 14, 16, $B_r$ falls off, but unlike $B_z$ of FIG. 5, $B_r$ does not fall off nearly as much, and still maintains a healthy value 33 near the middle of gap 15. This indicates that, in the vicinity of electron flight, $B_r$ will be enlarged at the expense of $B_z$, increasing wiggler output and minimizing the likelihood of gyroresonance, without changing electron energy.

One can use computer codes also to plot flux intensities in gap 15 to gain insight in the performance of wigglers such as 10. One such suite of codes is the POISSON/SUPERFISH group of codes for magnet/rf cavity design, which have been developed over a period of fifteen years. They have experienced tremendous popularity since the early 1970's. The main developers were Ronald Holsinger (while at Los Alamos Scientific Laboratory) and Klaus Halbach of Lawrence Berkeley Laboratory. POISSON is capable of mathematically simulating the performance of two-dimensional magnets, including the effects of permeable materials. Documentation, maintenance, distribution, and consultation for the POISSON group has, until recently, been provided by the Accelerator Code Group of the Los Alamos National Laboratory. See, e.g., M. T. Menzel et al., "User's Guide for the POISSON/SUPERFISH Group of Codes," Los Alamos National Laboratory Report LA-UR-87-115 (January, 1987); "POISSON/SUPERFISH Reference Manual," Los Alamos National Laboratory Report LA-UR-87-126 (January 1987).

Figure 7:
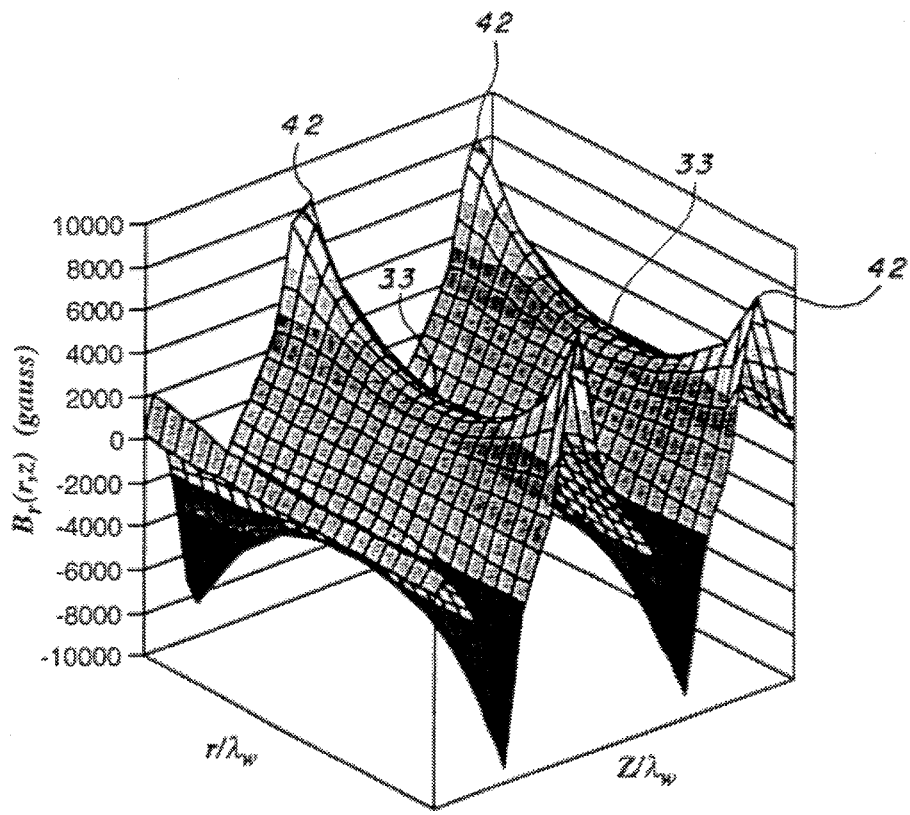
FIG. 7 is a plot like that of FIG. 6, but done by the POISSON computer codes.

FIG. 7 is such a plot using the POISSON codes, again for gap 15 being one half of $\lambda_w$. The plot is in good agreement with that of FIG. 6, with relatively large radial magnetic flux densities away from members 14 and 16.

Figure 8:
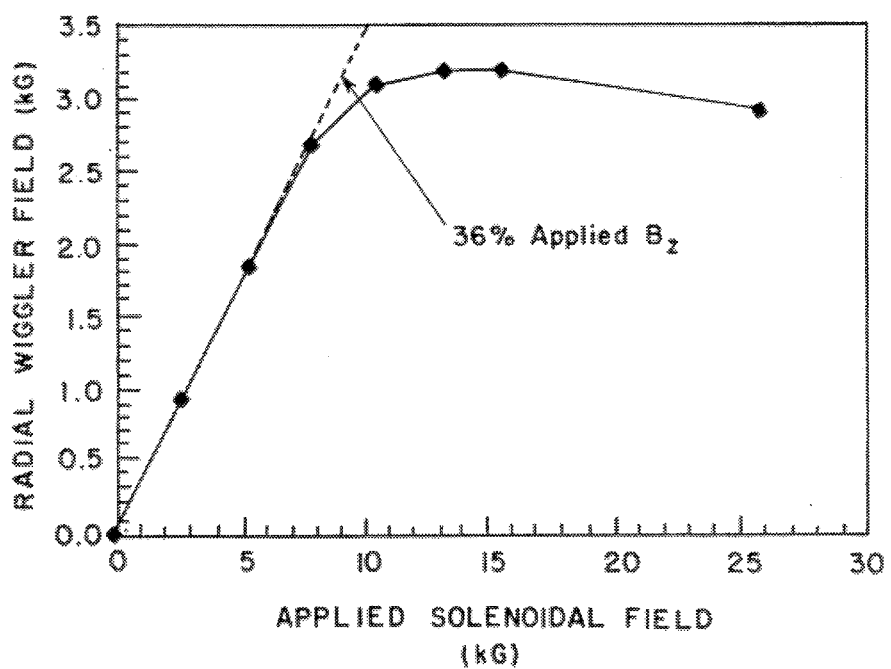
FIG. 8 is a graph of radial magnetic flux density versus solenoid field for $\lambda_w$ as in the embodiments of FIGS. 5–7, done by the POISSON codes.

FIG. 8 is a plot, also done by the POISSON codes, of $B_r$ as a function of applied solenoid field, again for a wiggler gap 15 which is half that of $\lambda_w$, and again for low-carbon steel. $B_r$ increases linearly to about 8 kGauss of solenoid field, where the low-carbon steel begins to saturate. In the linear portion of FIG. 8, a substantial amount of axial solenoid field is converted to radial field $B_r$, roughly about 36% (the slope of the linear portion of in FIG. 8).

Figure 9:
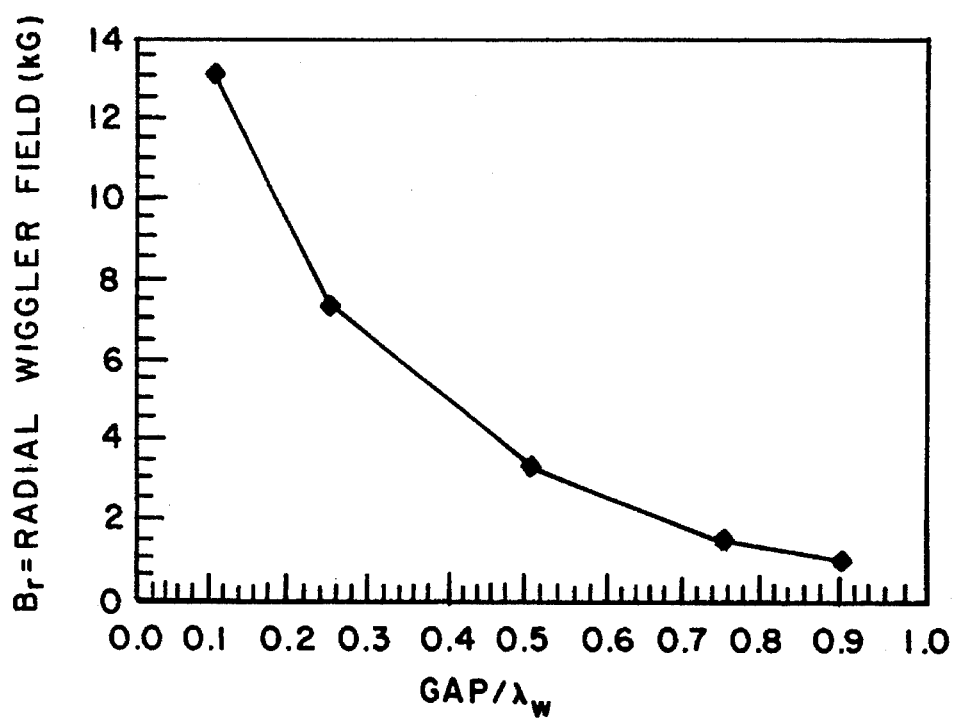
FIG. 9 is a graph of the maximum radial magnetic flux density obtainable from low-carbon steel versus normalized gap distance in the embodiment of FIGS. 5–8, done by the POISSON codes.

FIG. 9 plots $B_r$ as a function of gap 15-to-$\lambda_w$ ratio, for the otherwise same wiggler. Each point in FIG. 9 is the highest radial flux density obtained, for the particular gap to $\lambda_w$ ratio, for a range of solenoid flux densities. As expected, $B_r$ falls off exponentially with increasing gap, but for reasonably small gaps, large wiggler fields are seen to be practical.

Figure 10:
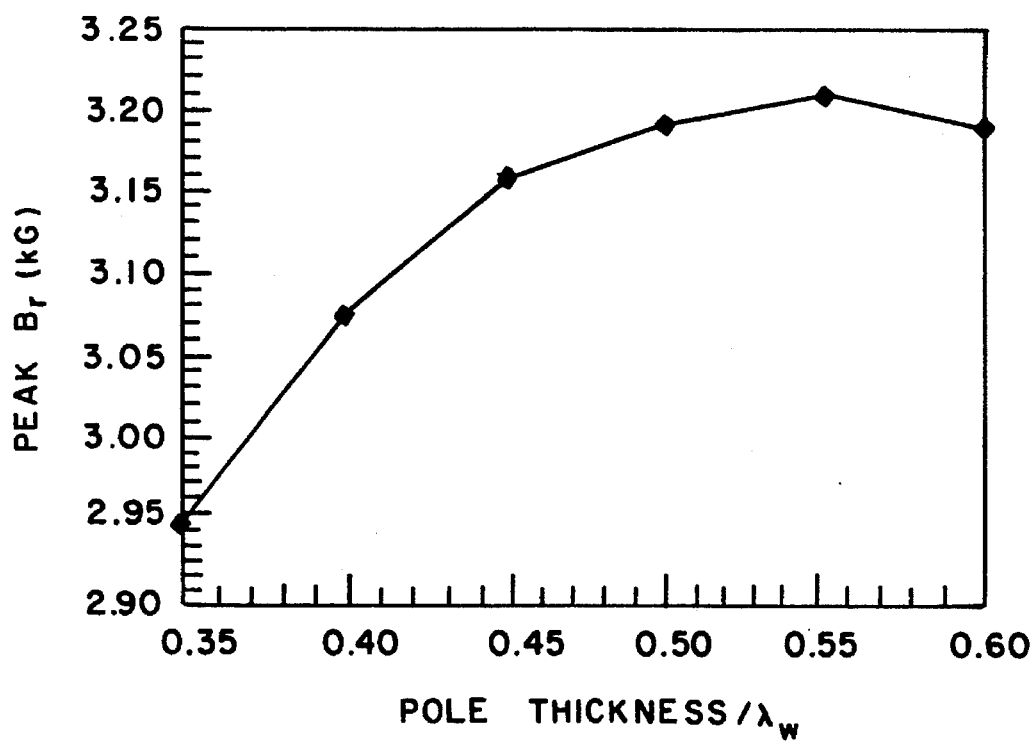
FIG. 10 is a graph of the peak radial magnetic flux density obtainable from low-carbon steel versus normalized central pole thickness for the embodiment of FIGS. 5-9, done by the POISSON codes.

FIG. 10 is a plot, done by the POISSON codes, of peak $B_r$ (e.g. reference numeral 42 on FIGS. 6–7) for a wiggler with low-carbon steel ferromagnetic sections, an outer ring thickness (in axial direction 18) of one-half $\lambda_w$, and a gap 15 of one-half $\lambda_w$. Peak $B_r$ increases with increasing pole thickness (i.e. thickness in axial direction 18 of ferromagnetic sections 30 of inner member 14). The largest peak is at about 0.55 pole thickness, which suggests an axial overlap of about 5% between ferromagnetic members 22, 30 optimizes radial field strength in gap 15 for these materials and relative dimensions.

The foregoing describes what is considered to be the most practical and preferred embodiments. It is recognized, however, that obvious modifications to these embodiments may occur to those with skill in the art. Accordingly, the scope of the invention is to be discerned solely by reference to the appended claims, wherein:

We claim:

1. An electrogmagnetic wiggler, comprising:

an outer member disposed cylindrically about a central axis; and an inner member disposed aloha said central axis and within said outer meter;

wherein said outer member comprises a plurality of sections along said axis alternatingly of ferromagnetic and non-ferromagnetic material, the total length along said axis of any one of said sections of said ferromagnetic material and anyone of said sections of said non-ferromagnetic material is substantially the same, said total length being the period $\lambda_w$ of said wiggler;

wherein said inner member comprises a plurality of sections along said axis of ferromagnetic and non-ferromagnetic material, said sections of said inner member being disposed along said axis, the total length said axis of any one of said sections of said ferromagnetic material of said inner member, and anyone of said sections of said non-ferromagnetic material of said inner member, is substantially said $\lambda_w$:

wherein the sequence of said sections along said axis is shifted effective to cause said sections of ferromagnetic material of said outer member to be radially opposite said sections of non-ferromagnetic material of said inner member along said axis, and said sections of said ferromagnetic material of said inner member to be radially opposite said sections of non-ferromagnetic material of said outer member along said axis; and wherein said inner member and said outer member are disposed right-circular cylindrically about said axis.

2. An electromagnetic wiggler, comprising:

outer member disposed cylindrically about a central axis; and an inner member disposed along said central axis and within said outer member;

wherein said outer member comprises a plurality of sections along said axis alternatingly of ferromagnetic and non-ferromagnetic material, the total length along said axis of any one of said sections of said ferromagnetic material and any one of said sections of said non-ferromagnetic material; is substantially the same, said total length being the period $\lambda_w$ of said wiggler:

wherein said inner member comprises a plurality of sections along said axis of ferromagnetic and non-ferromagnetic material said sections of said inner member being disposed along said axis, the total length along said axis of any one of said sections of said ferromagnetic material of said inner member, and any one of said sections of said non-ferromagnetic material of said inner member, is substantially said $\lambda_w$;

wherein the sequence of said sections along said axis is shifted effective to cause said sections of ferromagnetic material of said outer member to be radially, opposite said sections of non-ferromagnetic material of said inner member along said axis, and said sections of said ferromagnetic material of said inner member to be radially opposite said sections of non-ferromagnetic material of said outer member along said axis;

wherein said inner member and said outer member are disposed right-circular cylindrically about said axis;

wherein the ratio of the distance, in a direction orthogonal to said axis; between said inner member and said outer member, to said $\lambda_w$, is about 0.35 to about 0.8; and wherein the length along said axis of said section of ferromagnetic material are sized effective to cause each said section of ferromagnetic material of said inner member to axially overlap two consecutive radially opposite sections of said ferromagnetic material of said outer member by about 5%.

3. The wiggler of claim 4, wherein said wiggler comprises a means for generating a radial magnetic flux density between said inner member and said outer member of less than at least about 8kGauss.

4. An electromagnetic wiggler, comprising:

an outer member disposed cylindrically about a central axis; and an inner member disposed along said central axis and within said outer member;

wherein said outer member comprises a plurality of sections along said axis alternatingly of ferromagnetic and non-ferromagnetic material, the total length along said axis of any one of said sections of said ferromagnetic material and any one of said sections of said non-ferromagnetic material, is substantially the same, said total length being the period $\lambda_w$ of said wiggler;

wherein said inner member comprises a plurality of sections along said axis of ferromagnetic and non-ferromagnetic material, said sections of said inner member being disposed along said axis, the total length along said axis of any one of said sections of said ferromagnetic material of said inner member, and any one of said sections of said non-ferromagnetic material of said inner member, is substantially said $\lambda_w$;

wherein the sequence of said sections along said axis is shifted effective to cause said sections of ferromagnetic material of said outer member to be radially opposite said sections of non-ferromagnetic material of said inner member along said axis, and said sections of said ferromagnetic material of said inner member to be radially opposite said sections of non-ferromagnetic material of said outer member along said axis; and wherein said wiggler comprises a means for generating a radial magnetic flux density between said inner member and said outer member of less than at least about 8kGauss.

5. An electromagnetic wiggler, comprising:

an outer member disposed cylindrically about a central axis; and an inner member disposed along said central axis and within said outer member;

wherein said outer member comprises a plurality of sections along said axis alternatingly of ferromagnetic and non-ferromagnetic material, the total length along said axis of and one of said sections of said ferromagnetic material and any one of said sections of said non-ferromagnetic material, is substantially the same, said total length being the period $\lambda_w$ of said wiggler;

wherein said inner member comprises a plurality of sections along said axis of ferromagnetic and non-ferromagnetic material, said sections of said inner member being disposed along said axis, the total length along said axis of any one of said sections of said ferromagnetic material of said inner member, and any one of said sections of said non-ferromagnetic material of said inner member, is substantially said $\lambda_w$;

wherein the sequence of said sections along said axis is shifted effective to cause said sections of ferromagnetic material of said outer member to be radially opposite said sections of non-ferromagnetic material of said inner member along said axis, and said sections of said ferromagnetic material of said inner member to be radially opposite said sections of non-ferromagnetic material of said outer member along said axis; and wherein the ratio of the distance, in a direction orthogonal to said axis, between said inner member and said outer member, to said $\lambda_w$, is about 0.35 to about 0.8.

6. An electromagnetic wiggler, comprising:

an outer member disposed cylindrically about a central axis; and an inner member disposed along said central axis and within said outer member;

wherein said outer member comprises a plurality of sections along said axis alternatingly of ferromagnetic and non-ferromagnetic material, the total length along said axis of any one of said sections of said ferromagnetic material and any one of said sections of said non-ferromagnetic material, is substantially the same, said total length being the period $\lambda_w$ of said wiggler;

wherein said inner member comprises a plurality of sections along said axis of ferromagnetic and non-ferromagnetic material, said sections of said inner member being disposed along said axis, the total length along said axis of any one of said sections of said ferromagnetic material of said inner member, and any one of said sections of said non-ferromagnetic material of said inner member, is substantially said $\lambda_w$;

wherein the sequence of said sections along said axis is shifted effective to cause said sections of ferromagnetic material of said outer member to be radially opposite said sections of non-ferromagnetic material of said inner member along said axis, and said sections of said ferromagnetic material of said inner member to be radially opposite said sections of non-ferromagnetic material of said outer member along said axis; and wherein the length along said axis of said section of ferromagnetic material are sized effective to cause each said section of ferromagnetic material of said inner member to axially overlap two consecutive radially opposite sections of said ferromagnetic material of said outer member by about 5%.

* * * * *